(12) United States Patent
Nakata

(10) Patent No.: US 11,847,715 B2
(45) Date of Patent: Dec. 19, 2023

(54) IMAGE PROCESSING APPARATUS, IMAGE DISTRIBUTION SYSTEM, AND IMAGE PROCESSING METHOD

(71) Applicant: Sony Interactive Entertainment Inc., Tokyo (JP)

(72) Inventor: Masashi Nakata, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 116 days.

(21) Appl. No.: 17/614,800

(22) PCT Filed: Jul. 13, 2020

(86) PCT No.: PCT/JP2020/027211
§ 371 (c)(1),
(2) Date: Nov. 29, 2021

(87) PCT Pub. No.: WO2021/015035
PCT Pub. Date: Jan. 28, 2021

(65) Prior Publication Data
US 2022/0230400 A1    Jul. 21, 2022

(30) Foreign Application Priority Data

Jul. 19, 2019    (JP) ................. 2019-133588

(51) Int. Cl.
| | |
|---|---|
| *G06T 7/11* | (2017.01) |
| *G06T 7/70* | (2017.01) |
| *H04N 13/332* | (2018.01) |
| *H04N 13/383* | (2018.01) |
| *G06V 20/20* | (2022.01) |
| *G06V 10/62* | (2022.01) |
| *G06T 19/00* | (2011.01) |
| *G06V 10/22* | (2022.01) |
| *H04N 7/18* | (2006.01) |

(52) U.S. Cl.
CPC .............. *G06T 19/006* (2013.01); *G06T 7/11* (2017.01); *G06T 7/70* (2017.01); *G06V 10/235* (2022.01);
(Continued)

(58) Field of Classification Search
CPC . G06T 19/006; G06T 7/11; G06T 7/70; G06T 2207/10016; G06T 2207/20021;
(Continued)

(56) References Cited

U.S. PATENT DOCUMENTS

| 6,577,329 B1 * | 6/2003 | Flickner ................. G06F 3/013 715/831 |
| 7,965,885 B2 | 6/2011 | Iwai |

(Continued)

FOREIGN PATENT DOCUMENTS

| JP | 2006109172 A | 4/2006 |
| JP | 2008042801 A | 2/2008 |

(Continued)

OTHER PUBLICATIONS

International Search Report for corresponding PCT Application No. PCT/JP2019/027211, 7 pages, dated Sep. 29, 2020.

(Continued)

*Primary Examiner* — Jitesh Patel
(74) *Attorney, Agent, or Firm* — Matthew B. Dernier, Esq.

(57) ABSTRACT

In an image processing apparatus, a region extraction part extracts an image of the sky as an image of a target object not included in an object of interest in a moving image of content, on the basis of at least any of changes in pixel values, a frequency at which a line of sight is directed, a distance from a camera, registered information designating the target object, and the like. In the extracted region, a different image presentation part displays an image indicative of a magnified image of a player and character information for cheering as an image different from the sky image.

14 Claims, 7 Drawing Sheets

(52) U.S. Cl.
CPC .............. *G06V 10/62* (2022.01); *G06V 20/20* (2022.01); *H04N 7/183* (2013.01); *H04N 13/332* (2018.05); *H04N 13/383* (2018.05); *G06T 2207/10016* (2013.01); *G06T 2207/20021* (2013.01); *G06V 2201/07* (2022.01)

(58) Field of Classification Search
CPC ......... G06T 11/00; G06T 1/00; G06V 10/235; G06V 10/62; G06V 20/20; G06V 2201/07; H04N 7/183; H04N 13/332; H04N 13/383; H04N 5/66; G09G 5/00; G09G 5/36; G09G 5/38
See application file for complete search history.

(56) References Cited

U.S. PATENT DOCUMENTS

| | | | |
|---|---|---|---|
| 8,345,283 | B2 | 1/2013 | Ohara |
| 10,110,802 | B2 | 10/2018 | Ardo |
| 2006/0072022 | A1 | 4/2006 | Yoshiaki |
| 2009/0040551 | A1 | 2/2009 | Ohara |
| 2013/0311308 | A1 | 11/2013 | Jen-Hsun |
| 2015/0006278 | A1 | 1/2015 | Di Censo |
| 2016/0117861 | A1* | 4/2016 | Liu .................. G06F 3/013 345/633 |
| 2018/0191952 | A1 | 7/2018 | Ardo |
| 2020/0057487 | A1* | 2/2020 | Sicconi ................ G06T 7/254 |

FOREIGN PATENT DOCUMENTS

| | | |
|---|---|---|
| JP | 2009042801 A | 2/2009 |
| JP | 2012048639 A | 8/2012 |
| JP | 2015011355 A | 1/2015 |
| JP | 2017084259 A | 5/2017 |
| JP | 2018110398 A | 7/2018 |
| JP | 2018180654 A | 11/2018 |

OTHER PUBLICATIONS

Noticed of Reasons for Refusal for corresponding JP Application No. 2019-133588, 7 pages dated Jun. 12, 2023.

* cited by examiner

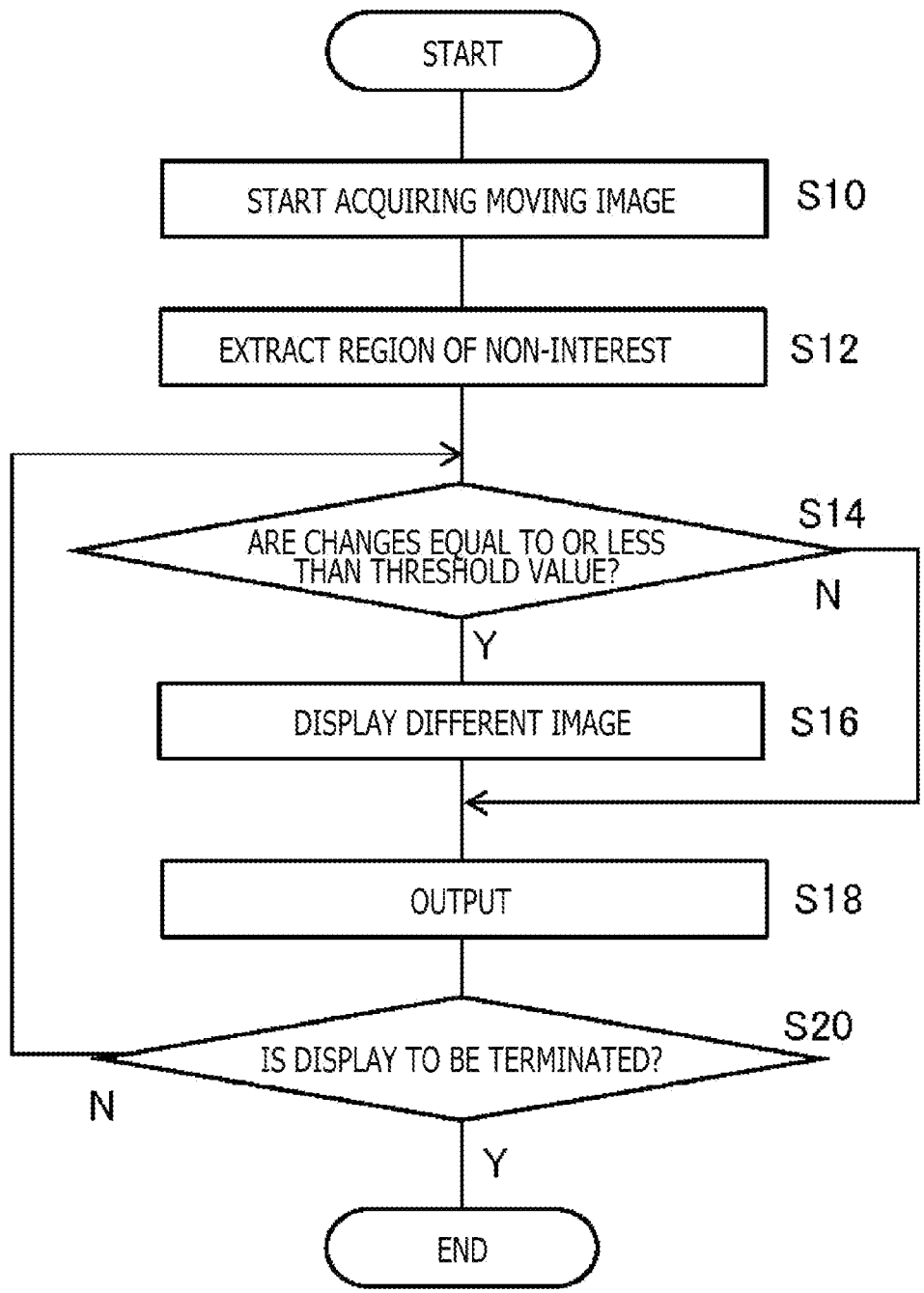

IMAGE PROCESSING APPARATUS, IMAGE DISTRIBUTION SYSTEM, AND IMAGE PROCESSING METHOD

TECHNICAL FIELD

The present invention relates to an image processing apparatus for processing content involving image display, an image distribution system, and an image processing method.

BACKGROUND ART

Advances in image processing technology and the expansion of the network environment are making it possible to enjoy electronic content such as videos and games casually in diverse forms. For example, a head-mounted display worn by a user displays panoramic video image in a field of view corresponding to the face direction of the user. This enables enhancing the sense of immersion in a visual world and improving the operability of applications such as games. Also, diverse wearable display devices permit composition of a virtual object in a suitable position in real-time video image captured in the user's field of view or in an appropriate position in a real image transmitted through a glass part. This makes it possible to merge the real world with the virtual world.

SUMMARY

Technical Problem

It may be desired to let users enjoying the above-mentioned content recognize various kinds of notices and advertisements different from the details of the content. In such cases, an image carrying such information may conceivably be brought into the user's field of view. However, the content being partially hidden by such an additional image may incur feelings of discomfort or botheration. Although the additional image might be displayed in a separate region within the screen, this requires shifting the line of sight far from the content; the additional image may thus fail to draw attention.

The present invention has been made in view of the above circumstances. An object of the invention is therefore to provide a technology by which information is suitably presented in content including image display.

Solution to Problem

One embodiment of the present invention relates to an image processing apparatus. This image processing apparatus includes an image acquisition part configured to acquire data of a moving image representing a space to be viewed, a region extraction part configured to extract, as a region of non-interest, a region of an image of any one of target objects not included in an object of interest, in a frame of the moving image, and a different image presentation part configured to present and output an image different from the image of the target object in the region of non-interest.

Another embodiment of the present invention relates to an image distribution system. This image distribution system includes the above-described image processing apparatus, and a server configured to transmit the data of the moving image to the image processing apparatus, the server including a viewing rate calculation part configured to acquire information regarding a direction of a line of sight of a user viewing an image output from the image processing apparatus, the viewing rate calculation part further calculating a viewing rate of the different image on the basis of changes in the direction of the line of sight before and after the different image is displayed.

A further embodiment of the present invention relates to an image distribution system. This image distribution system includes a server and an image processing apparatus. The server includes an image acquisition part configured to acquire data of a moving image representing a space to be viewed, a region extraction part configured to extract, as a region of non-interest, a region of an image of any one of target objects not included in an object of interest in a frame of the moving image, and a different image presentation part configured to present an image different from the image of the target object in the region of non-interest. The image processing apparatus acquires over a network the data of the moving image output from the server and representing the different image, and the image processing apparatus further causes a display apparatus to display the moving image.

A still further embodiment of the present invention relates to an image processing method. This image processing method performed by an image processing apparatus, includes a step of acquiring data of a moving image representing a space to be viewed, a step of extracting, as a region of non-interest, a region of an image of any one of target objects not included in an object of interest in a frame of the moving image, and a step of outputting and presenting an image different from the image of the target object in the region of non-interest.

It is to be noted that arbitrary combinations of the above constituent elements as well as modes realized by converting expressions of the present invention between a method, a device, a system, a computer program, a recording medium on which the computer program is recorded, and the like are also effective as modes of the present invention.

Advantageous Effects of Invention

According to the present invention, information is suitably presented in content including image display.

BRIEF DESCRIPTION OF DRAWINGS

FIG. 9 is a flowchart indicative of processing steps of displaying a content image, the steps being performed by the image processing apparatus in the present embodiment.

DESCRIPTION OF EMBODIMENTS

Figure 1:
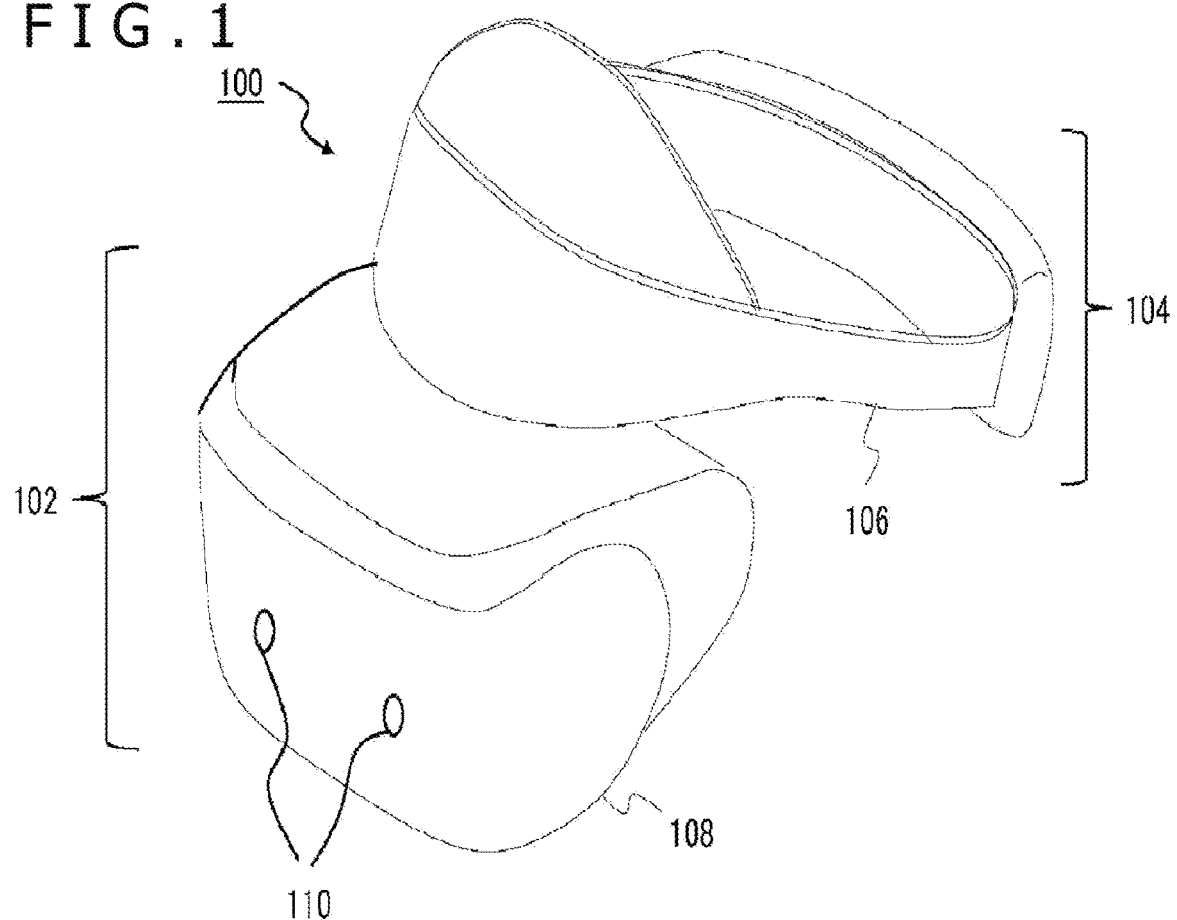
FIG. 1 is a diagram depicting an example of an appearance of a head-mounted display in the present embodiment.

The present embodiment relates to a technology for processing content including image display. What details the image represents, what purpose the display is for, whether the video image is given in real time or recorded, whether or not the display includes a real image, what form the display device is in, or the like, are not particularly limited to that extent. What follows is primarily an explanation of a representative example in which a moving image is displayed on a head-mounted display. FIG. 1 is a diagram depicting an example of an appearance of a head-mounted display in the present embodiment. In this example, a head-mounted display 100 is configured with an output mechanism part 102 and a wearing mechanism part 104. The wearing mechanism part 104 includes a wearing band 106 that, when worn by the user, surrounds his or her head to secure the apparatus thereto.

The output mechanism part 102 includes a housing 108 shaped in such a manner as to cover both eyes when the head-mounted display 100 is worn by the user. Inside the housing 108, included is a display panel that directly faces the eyes when the head-mounted display 100 is worn. Also provided inside the housing 108 may be lenses interposed between the display panel and the user's eyes when the head-mounted display 100 is worn, the lenses serving to magnify images. Preferably, a stereoscopic view may be implemented by displaying respective stereoscopic images corresponding to the parallax between the eyes in a right region and a left region formed by bisecting the display panel.

The head-mounted display 100 may be further provided with speakers or earphones at positions corresponding to the user's ears upon wearing the head-mounted display 100. In this example, the head-mounted display 100 has a stereo camera 110 provided at the front of the housing 108 to capture moving image of the surroundings in a field of view corresponding to the user's line of sight. Further, the head-mounted display 100 may include, in or outside the housing 108, any one of such diverse sensors as an acceleration sensor, a gyro sensor, and a geomagnetic sensor for deriving a motion, a posture, and a position of the head-mounted display 100.

Figure 2:
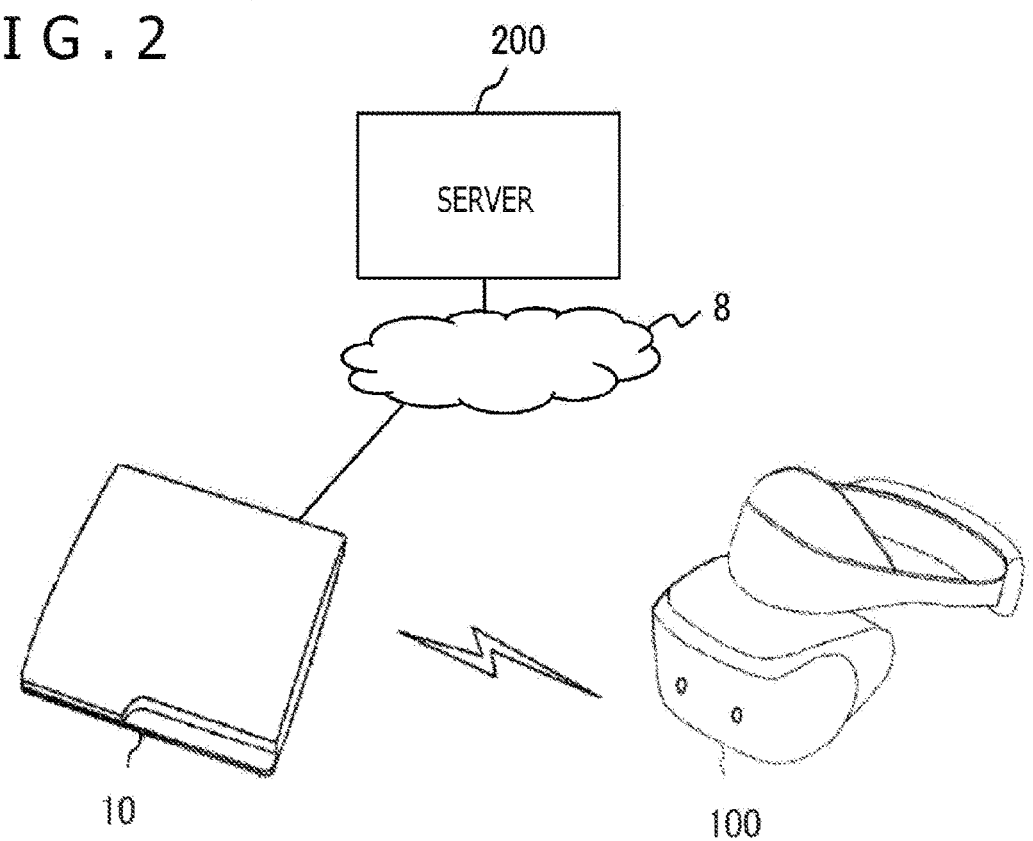
FIG. 2 is a diagram depicting an example of a configuration of a content processing system to which the present embodiment of this invention may be applied.

FIG. 2 is a diagram depicting an example of a configuration of a content processing system to which the present embodiment can be applied. The head-mounted display 100 is connected by wireless communication to an image processing apparatus 10. Alternatively, the connection may be a wired connection using a USB (Universal Serial Bus) cable, for example. The image processing apparatus 10 is connected with a server 200 via a network 8. The server 200 transmits moving images and sounds of a display object as content data to the image processing apparatus 10.

The image processing apparatus 10 performs necessary processes on the content data transmitted from the server 200, and sends the processed data to the head-mounted display 100. Alternatively, the image processing apparatus 10 may process internally-held content data to generate the image and sound data or perform predetermined processes on the moving image being captured by the stereo camera 110 of the head-mounted display 100, before transmitting the processed data to the head-mounted display 100. In such cases, the server 200 may not be needed. As another alternative, the image processing apparatus 10 may be incorporated in the head-mounted display 100.

In addition, as mentioned above, the device for displaying moving images in this embodiment is not limited to the head-mounted display. The display device may alternatively be any one of diverse wearable displays, a flat-screen display such as a television receiver, a mobile terminal, or a projector. In a case where the head-mounted display 100 is adopted, the image processing apparatus 10 acquires continuously the position and posture of the user wearing the head-mounted display 100 based on measured values from motion sensors incorporated in the head-mounted display 100 or on images captured by the stereo camera 11, and generates a display image in a field of view corresponding to them.

A representative example of such display technology described above is virtual reality (VR) that presents the image corresponding to the user's field of view in a three-dimensional space indicative of a virtual world or in a previously acquired panoramic image. Also, the image processing apparatus 10 may implement augmented reality (AR) by rendering a virtual object in a suitable position of the image being captured in real time by the stereo camera 110. Alternatively, the image processing apparatus 10 may reproduce the content image in a fixed field of view, regardless of a motion of the user's head.

Figure 3:
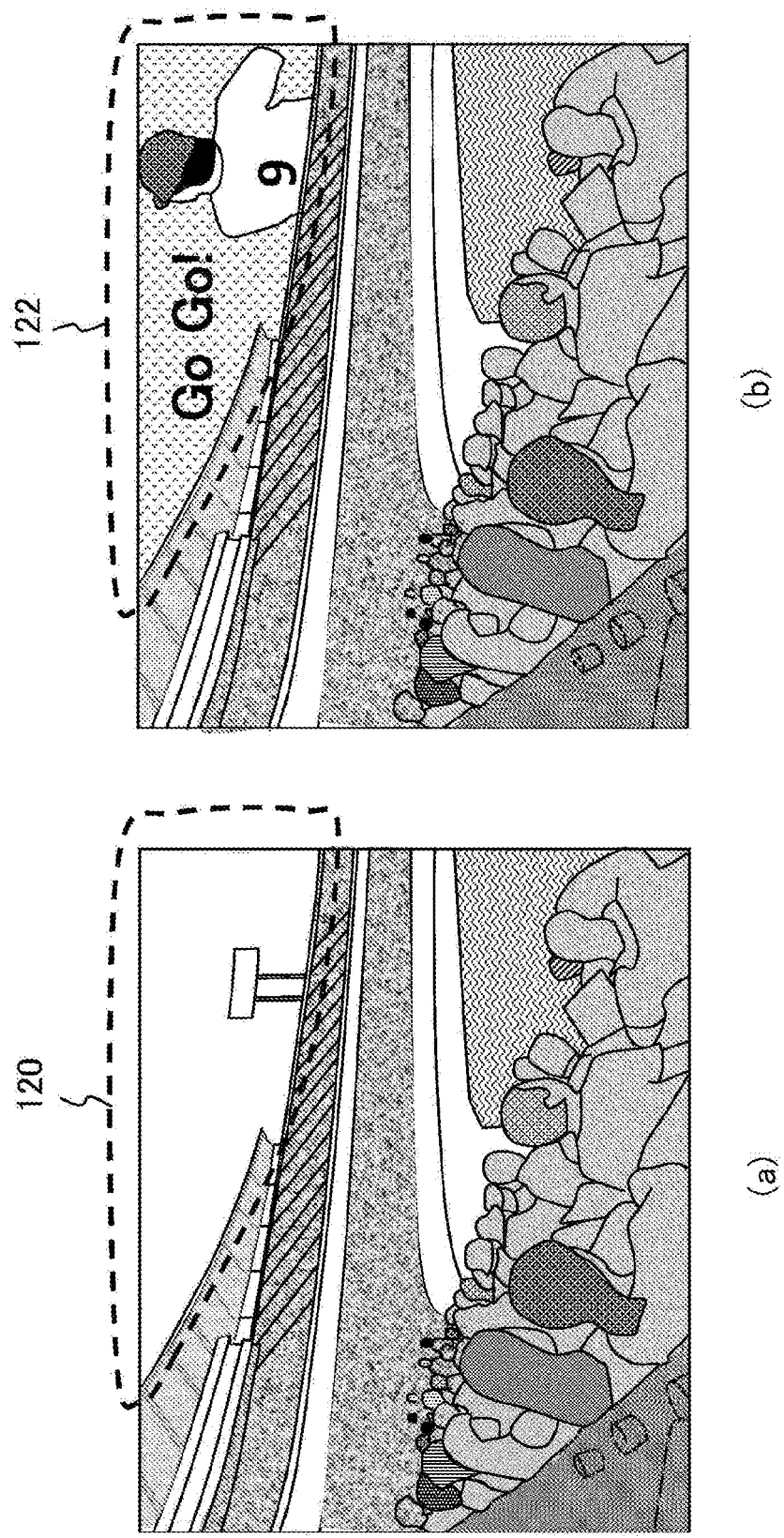
FIG. 3 is a diagram depicting typical images of content to be processed by the present embodiment.

FIG. 3 is a diagram depicting typical images of content to be processed in the present embodiment. In this example, images of a baseball game in a baseball stadium are assumed. For instance, if the entire stadium during the game is captured with a wide-angle lens, and the image such as one in Subfigure (a) is displayed in a field of view corresponding to the head motion of the user wearing the head-mounted display 100, even a user at a remote location can experience realistic sensations as if the user was also viewing the game from the stands. Note that, if similar images are displayed as stereoscopic images for the right and left eyes with a parallax therebetween, a stereoscopic view can be implemented. Such images may also be obtained by the stereo camera 110 of the head-mounted display 100 worn by a user actually in the stands.

In a case where the image in Subfigure (a) is displayed, an object drawing the user's attention is primarily a field on which the players are present. There is a low possibility that a sky image 120 or the like will draw attention, for example. This embodiment thus utilizes such a region out of the object of interest to present various images and various pieces of information. That is, a region of an image of any one of target objects not included in the object of interest is extracted as a "region of non-interest" and an image different from the target object is displayed.

In the illustrated example, as depicted in Subfigure (b), an image 122 is displayed in the sky image region to indicate a magnified image of a player and character information for cheering. The object to be displayed may be not only what is present in the same space, but also any of such diverse objects as an image captured in a different space, notices for the user, advertisements, or a comment from another user watching the same video image. The object to be displayed may be a moving image, a still image, character information, or a combination thereof. In the description that follows, the object as the region of non-interest is referred to as the "replacement object," and an image different from the image of the replacement object to be displayed in the region of non-interest is referred to as the "different image."

Suitably selecting the region of non-interest permits visual recognition of necessary information without hiding the object of interest while minimizing the movement of the line of sight. Further, replacing the image of the actually-captured object with a different image brings about a sense of unity between the original video image and the different image. Especially in a case where the field of view is varied in keeping with the head motion of the user wearing the head-mounted display 100, the unity between the different image and the remaining image reduces the feelings of discomfort upon changing of the field of view and is not likely to impair realistic sensations.

Figure 4:
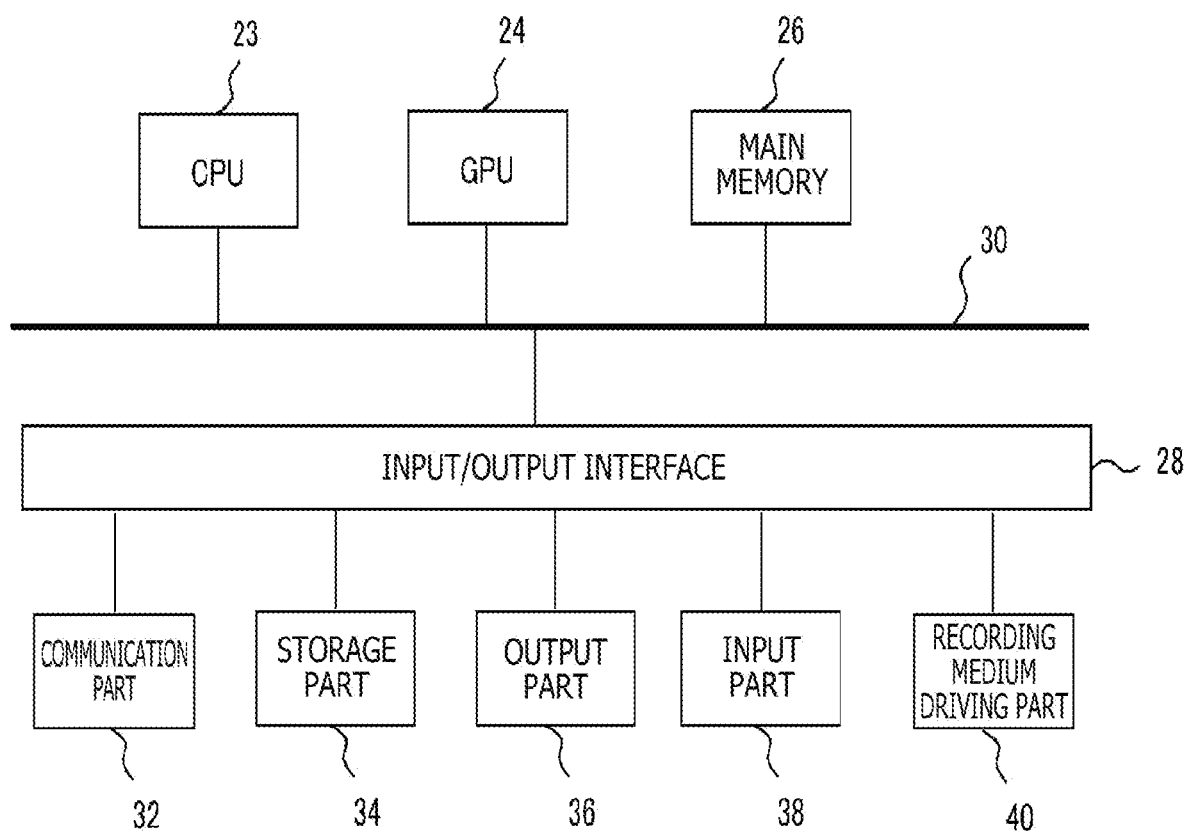
FIG. 4 is a diagram depicting an internal circuit configuration of an image processing apparatus in the present embodiment.

FIG. 4 is a diagram depicting an internal circuit configuration of the image processing apparatus 10. The image processing apparatus 10 includes a CPU (Central Processing Unit) 23, a GPU (Graphics Processing Unit) 24, and a main memory 26. These components are interconnected via a bus 30. The bus 30 is further connected with an input/output interface 28. The input/output interface 28 is connected with a communication part 32 constituted by a peripheral device interface supporting the USB and IEEE (Institute of Electrical and Electronics Engineers) 1394 standards and by a wired or wireless LAN (Local Area Network) network interface for establishing communication with the server 200 and head-mounted display 100, a storage part 34 such as a hard disk drive or a nonvolatile memory, an output part 36 that outputs data to the head-mounted display 100, an input part 38 that receives input of data from the head-mounted display 100, and a recording medium driving part 40 that drives removable recording media such as a magnetic disk, an optical disk, or a semiconductor memory.

The CPU 23 controls the image processing apparatus 10 as a whole by executing an operating system stored in the storage part 34. The CPU 23 further executes various types of programs that are read out from the removable recording medium and loaded into the main memory 26 or which are downloaded via the communication part 32. The GPU 24 has the functions of both a geometry engine and a rendering processor. The GPU 24 performs rendering processes according to rendering instructions from the CPU 23 and outputs the result of the processing to the output part 36. The main memory 26 includes a RAM (Random Access Memory) that stores programs and data necessary for the processing. Note that the server 200 may also adopt the similar configuration as above.

Figure 5:
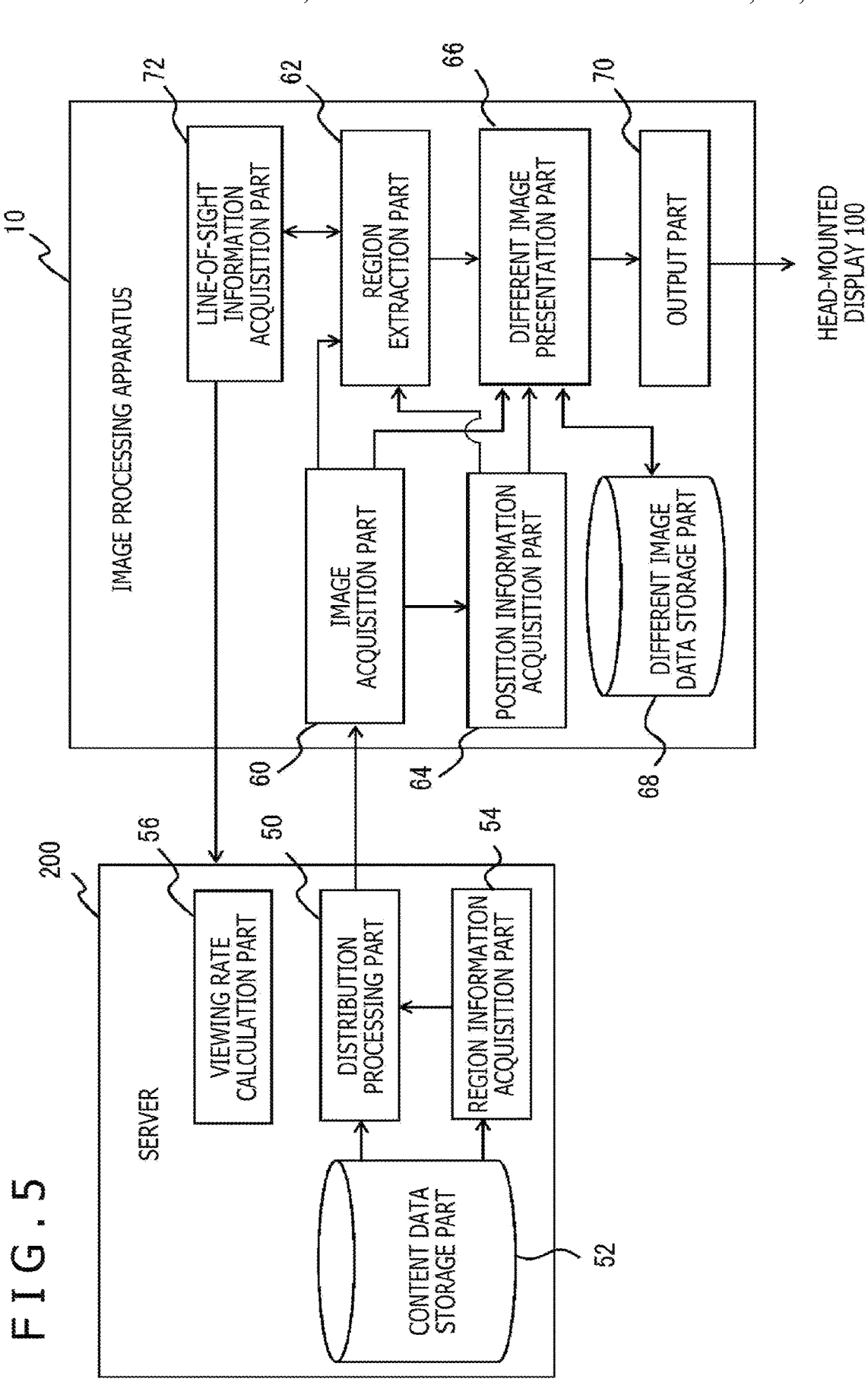
FIG. 5 is a diagram depicting functional block configurations of the image processing apparatus and a server in the present embodiment.

FIG. 5 is a diagram depicting functional block configurations of the image processing apparatus 10 and the server 200. The functional blocks illustrated in this drawing can be implemented by hardware such as the CPU 23, the GPU 24, and the main memory 26 depicted in FIG. 5 or by software such as programs that are loaded from the recording medium into the memory to implement such functions as information processing, image rendering, data input/output, and communication. Thus, it will be understood by those skilled in the art that these functional blocks can be implemented by hardware alone, by software alone, or by a combination of both in diverse forms and that the implementation is not limited to any one of them.

The image processing apparatus 10 includes an image acquisition part 60 that acquires data of a moving image indicative of a space to be viewed, a region extraction part 62 that extracts, from a frame of the moving image, a region of an image of a replacement object as a region of non-interest, a different image presentation part 66 that displays a different image in the region of non-interest, a position information acquisition part 64 that acquires a position of a subject in a three-dimensional image capturing space, a different image data storage part 68 that stores data of the different image, a line-of-sight information acquisition part 72 that acquires information regarding a direction of a user's line of sight, and an output part 70 that outputs data of a display image to the head-mounted display 100.

The image acquisition part 60 acquires from the server 200 data of content selected by the user, for example. Alternatively, the image acquisition part 60 may read out the content data from a storage device inside the image processing apparatus 10. Then, the image acquisition part 60 decompresses the data of the acquired image as needed, and supplies the decompressed data to at least the region extraction part 62 and the different image presentation part 66. Further, the image acquisition part 60 may acquire from the server 200 what is needed out of the information necessary for extracting the region of non-interest or the information designating the region of non-interest, the position information regarding the subject being captured in a moving image in the three-dimensional space, and the data of a different image to be displayed or the information for designating the different image.

Given each frame of the moving image decompressed by the image acquisition part 60, the region extraction part 62 extracts the image region of the replacement object as the region of non-interest. For example, the region extraction part 62 extracts the image that conforms to the following conditions:

1. An image of a target object of which constituent pixels have their pixel values subjected to temporal changes equal to or less than a predetermined value;
2. An image of a target object that tends not to draw much attention in general;
3. An image of a target object to which the user's line of sight is directed with a frequency equal to or less than a predetermined value; and
4. An image of a target object to which a distance from the camera capturing a moving image in a three-dimensional image capturing space is equal to or more than a predetermined value.

Threshold values for use as criteria for the first, the third, and the fourth conditions above may be set for each moving image or shared for all moving images. For the second condition, the object that tends not to draw much attention in general, such as the sky or the ceiling, is decided as the replacement object. Such information necessary for extracting the image as a name, a color, a shape, and feature point distribution of that object are registered in advance for each moving image or in common to all moving images. In this case, the region extraction part 62 extracts the image of the registered replacement object, using existing target object recognition techniques such as pattern matching, feature point comparison, and background differencing.

For example, the sky image indicated in FIG. 3 applies to any of the first through the fourth conditions above. However, the conditions for extracting the region of non-interest are not intended to be limited to the above conditions. For example, the region extraction part 62 may detect an image motion based on frame-to-frame differences to extract the region of an image deemed to manifest no movement. In some cases, the region extraction part 62 may acquire registered information designating the region of non-interest itself from the server 200 or the like, and supply the acquired information simply to the different image presentation part 66. Also, the region extraction part 62 may extract a region that meets one condition or a region that meets two or more conditions.

Note that, since common images are configured such that the object of interest is often concentrated from the center downward, the above conditions may be supplemented with another condition requiring that given an upper region and a lower region vertically bisecting a frame of the moving image at a predetermined ratio, the upper region be selected for extraction of the region of non-interest. In any case, the region extraction part 62 extracts the region of non-interest preferably along the contour of the replacement object in units of an image of the subject. This makes it possible to bring about a sense of unity with the remaining subjects and not to impair realistic sensations as discussed above.

Note that the region extraction part 62 may extract multiple regions of non-interest or move a region of interest according to changes in a configuration of the moving image or changes in the display region. Further, the region extraction part 62 also continuously monitors an already extracted region of non-interest to determine whether the region deviates from the condition for the extraction. If the extracted region of non-interest is determined to have deviated from the condition, the region extraction part 62 eliminates the region of non-interest. When the region again meets the condition, the region extraction part 62 may again extract the same region as the region of non-interest.

Given each frame of the moving image, the different image presentation part 66 generates a frame of the display image by composing a different image in the region of non-interest. As with the sky image depicted in FIG. 3, the different image presentation part 66 may replace the entire region of non-interest with the different image or place the different image only in a portion of the region. Also, in a case where character information is presented as the different image, the different image presentation part 66 may display the characters along with the background such as a filled image or place only the characters directly onto the image of the replacement object.

In a display form in which the field of view changes in keeping with the head motion of the user, the different image presentation part 66 may move the display position of the different image in a manner keeping track of the changing of the field of view. In the example of the images in FIG. 3, for example, when the user turns to the right, the sky region within the field of view moves. At this time, if the display position of the different image is shifted to keep track of the movement of the region, the different image can be continuously displayed in the sky region within the field of view. Alternatively, the different image, once displayed, may be continuously displayed in the same position in the image of the replacement object, regardless of change in field of view. In this case, the different image can be made to appear pasted on the replacement object.

The different image presentation part 66 may read out the data of the different image from the different image data storage part 68 or acquire the data directly from the server 200. Also in the former case, the information identifying the data of the different image to be displayed and the information such as a display timing may also be acquired from the server 200. General computer graphics techniques can be used in composing the different images. Also, the different image presentation part 66 may set at least any of a frame rate or a resolution of the different image to be lower than that of the moving image at the destination for the composition. This reduces a data size of the display image.

The position information acquisition part 64 acquires position information of the subject being presented in the moving image, in a three-dimensional image capturing space. The position information acquisition part 64 may acquire the position information together with the content data from the server 200. Alternatively, the position information acquisition part 64 may acquire the position information by analyzing the image of the content or the data of a depth image sent along with the content image from the server 200. The depth image is a common image that represents, in image analysis, the distance from the camera to the subject in terms of the pixel values of the image.

The position information acquisition part 64 supplies the acquired position information to at least either the region extraction part 62 or the different image presentation part 66. The region extraction part 62 uses the position information when extracting as the region of non-interest an image meeting the fourth condition above, i.e., an image of the object to which the distance from the camera capturing a moving image in a three-dimensional image capturing space is equal to or more than a predetermined value. In the case of an image presenting an outdoor event, for example, the subject deemed sufficiently distant compared with a size of a venue is highly likely not to be the object of interest, such as the sky or the mountains constituting the background in the image.

In the case of an indoor event, too, the subject not likely to draw attention such as a ceiling or a wall is often far away from the camera capturing the main object. Thus, by setting an appropriate threshold value for the distance from the camera according to a scale of the space to be captured, it is possible suitably to identify the subject not likely to draw attention. On the other hand, when composing the different image in the extracted region of non-interest, the different image presentation part 66 decides a magnification factor for displaying the different image on the basis of the distance from the camera to the replacement object. Specifically, the more distant the replacement object is, the lower the magnification factor for the different image to be displayed thereon.

In this manner, the different image presentation part 66 can express the different image with the same sense of distance as the replacement object, allowing the different image to be recognized as closely a part of the image capturing space. In a case where stereoscopic view is implemented using stereoscopic images with a parallax therebetween, the different image presentation part 66 provides the parallax in a manner similar to that of the replacement object, thereby causing the different image to appear in the same position. Note that, if another condition is used for extracting the region of non-interest or if the magnification factor is fixed for displaying the different image, then the function of the position information acquisition part 64 may be omitted.

The line-of-sight information acquisition part 72 acquires information regarding the direction of the user's line of sight at a predetermined rate. For example, the line-of-sight information acquisition part 72 acquires the head motion of the user from measured values of a motion sensor, not depicted, incorporated in the head-mounted display 100, and takes the direction of a normal line to the user's face to be the light-of-sight direction. This embodiment may adopt any of the various currently available techniques for acquiring the head motion of the user wearing a wearable display such as the head-mounted display 100 and further, the face direction of the user.

Alternatively, the line-of-sight information acquisition part 72 may acquire a position that actually draws attention in the display image on the basis of information from a gaze point detector in the head-mounted display 100. There are known techniques for emitting a reference beam such as infrared rays to the user's eyeball and acquiring the direction of the pupil as well as the gaze point based on the distribution of the reflected light. Any of the currently available techniques for implementing the gaze point detector other than the above may be adopted.

The line-of-sight information acquisition part 72 supplies the acquired information regarding the line of sight to one of the region extraction part 62 and the server 200, or to both as needed. The region extraction part 62 uses the line-of-sight information when extracting as the region of non-interest the image of the subject to which the user's line of sight is directed with a frequency equal to or less than a predetermined value. For example, the region extraction part 62 extracts as the region of non-interest the image of the object to which the line of sight has been directed in an accumulated time period shorter than a predetermined value most recently. In this manner, the "frequency at which the line of sight is directed" may be a ratio of the time in which the line of sight has been directed.

Alternatively, the region extraction part 62 may extract the image of the subject to which the line of sight has been directed as frequently as, or less frequently than, a threshold value over a predetermined time period most recently. The server 200 uses line-of-sight information for extracting the region of non-interest and calculating the viewing rate of the different image as described later. It is to be noted, however, that this embodiment is not limited to using the line-of-sight information in extracting the region of non-interest or calculating the viewing rate. In a case where there is no need for the line-of-sight information, the function of the visual recognition information acquisition part 2 can be omitted.

The output part 70 outputs the display image data generated by the different image presentation part 66 to the head-mounted display 100 at a predetermined rate. Note that, whereas the output part 70 may concurrently output audio data included in the content data, the audio-related processing is omitted from the drawing.

The server 200 includes a distribution processing part 50 that distributes content data, a content data storage part 52 that stores the content data, a region information acquisition part 54 that acquires information regarding regions of non-interest, and a viewing rate calculation part 56 that calculates the viewing rate of the different image. Upon request or the like from the image processing apparatus 10, the distribution processing part 50 reads out content data from the content data storage part 52 and transmits the data. Alternatively, the distribution processing part 50 may transmit real-time video images captured by a camera, not depicted, on the spot.

The region information acquisition part 54 acquires the information required at a time of extracting the region of non-interest in the image processing apparatus 10. For example, the region information acquisition part 54 acquires identification information identifying the replacement objects decided in advance and their features, parameters for use in extracting the regions of non-interest, threshold values for use in determining the regions, and the like. Such information may be prepared beforehand in the content data storage part 52, read out therefrom and acquired. Alternatively, the information may be acquired by the region information acquisition part 54 itself analyzing the moving image. Particularly in the case of recorded content, detailed information regarding the content can be prepared through image analysis over long hours.

As another alternative, the region information acquisition part 54 may extract the region of non-interest itself, using the acquired information. The region information acquisition part 54 may further acquire the position of the subject in the three-dimensional image capturing space. In the case of distributing a video image captured in real time, the region information acquisition part 54 extracts the region of non-interest and acquires the position information regarding the subject in units of a frame of the captured moving image or at predetermined time intervals. In the case of extracting the region of non-interest, the region information acquisition part 54 uses techniques similar to those used by the region extraction part 62 in the image processing apparats 10.

In a case where the replacement object is decided according to the actual line of sight of the user on the image processing apparatus 10 as per the fourth condition above, the region information acquisition part 54 acquires the line-of-sight information obtained by the line-of-sight information acquisition part 72 in the image processing apparatus 10. In the case of obtaining the position of the subject in an image capturing space, the region information acquisition part 54 acquires the distance to the subject by the principle of triangulation, using stereoscopic images captured of the image capturing space by a pair of cameras positioned right and left with a predetermined distance apart, for example.

Alternatively, the region information acquisition part 54 acquires the distance to the subject by emitting a reference beam such as infrared rays to the subject and by measuring the time it takes to detect the reflected light therefrom. Such distance measurement techniques are well known. Note that a portion of these processes may be taken over by the position information acquisition part 64 in the image processing apparatus 10. For example, the position of the subject may be approximately estimated on the side of the server 200 and then acquired at a higher resolution on the side of the image processing apparatus 10. Alternatively, the region of non-interest and the position of the subject in the three-dimensional space may be acquired in detail on the side of the server 200, with the processing of the region extraction part 62 or of the position information acquisition part 64 omitted on the side of the image processing apparatus 10.

The region information acquisition part 54 may further read out from the content data storage part 52 the data of the different image to be displayed in the region of non-interest and the display-related rules such as the display timing of the different image and the display magnification factor thereof. As another alternative, the region information acquisition part 54 may decide the display magnification factor of the different image in accordance with the distance of the replacement object from the camera. The region information acquisition part 54 supplies the acquired information to the distribution processing part 50 as needed.

Accordingly, the distribution processing part 50 transmits to the image processing apparatus 10 not only the content data but also the information acquired by the region information acquisition part 54 and needed for extracting the region of non-interest and for displaying the different image. In this case, the distribution processing part 50 may reduce the size of the data to be transmitted by downsizing an amount of information by deleting, from the moving image, the image of the replacement object extracted by the region information acquisition part 54 as the region of non-interest and by increasing a compression ratio of that region, for example.

The viewing rate calculation part 56 acquires changes in the direction of the user's line of sight before and after the different image is displayed to estimate the viewing rate of the different image on the basis of the acquired changes. For example, with a state prior to display of the different image taken as the reference, the viewing rate calculation part 56 calculates as the viewing rate the frequency at which the line of sight is directed to the replacement object after the different image is displayed. Alternatively, an amount of increase in the frequency at which the line of sight is directed to the replacement object following display of the different image may be taken as the viewing rate.

The frequency at which the line of sight is directed may be the accumulated time for which the line of sight is directed in a predetermined time period or a ratio thereof as discussed above. Alternatively, the frequency may be the number of times the line of sight has been directed over a predetermined time period. Note that, in a case where the timing for displaying the different image is not acquired on the side of the server 200, the line-of-sight information acquisition part 72 in the image processing apparatus 10 acquires that timing from the region extraction part 62 and notifies the server 200 thereof. The viewing rate serves as an index indicative of the effects of the different image being displayed. In that sense, the viewing rate can be used as a ground for setting charges to display in a case where the different image is provided as advertisements.

Figure 6:
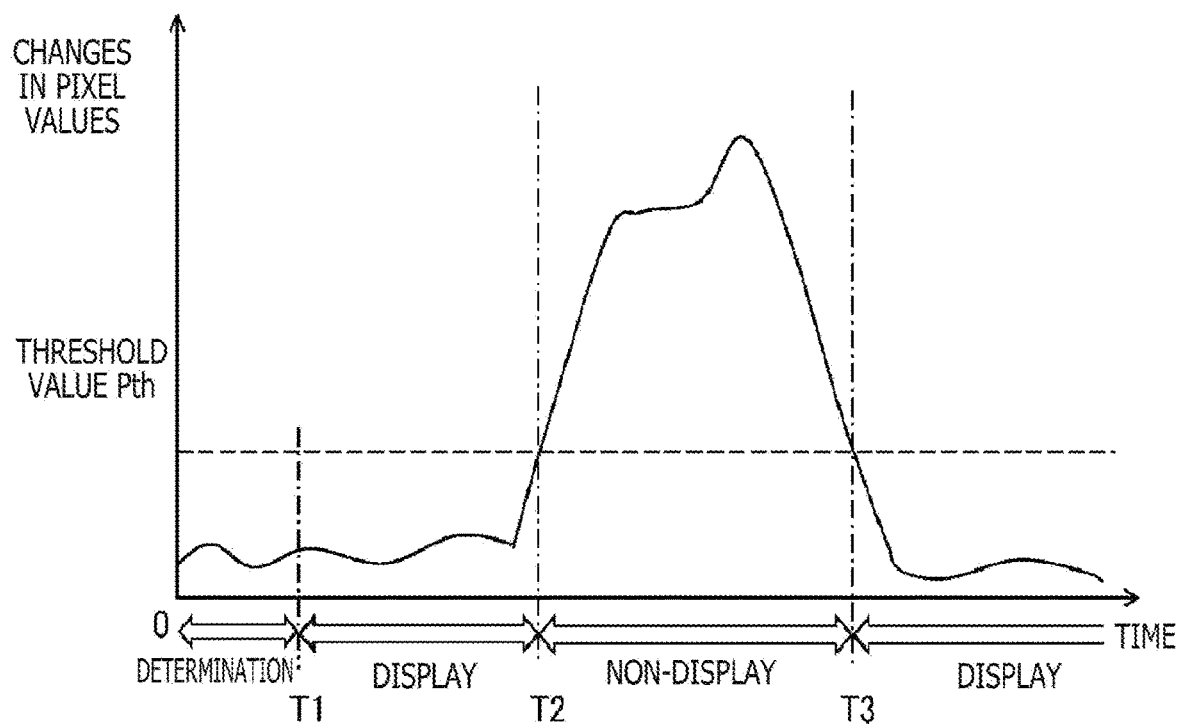
FIG. 6 is a diagram explanatory of a timing for a different image presentation part in the present embodiment of this invention to present a different image in a region of non-interest.

FIG. 6 is a diagram explanatory of a timing for the different image presentation part 66 to present the different image in the region of non-interest. This example indicates the case in which, on the basis of the first condition above, an image of an object of which the temporal changes in pixel values are equal to or smaller than a predetermined value is taken as the region of non-interest in which the different image is to be displayed. Here, the changes in pixel values on the vertical axis of the graph are, for example, averages of the temporal changes per unit time in the values of the pixels constituting the image of the subject appearing in the moving image, or of the temporal changes per unit time in the pixel values of the sampling points in the image.

The region extraction part 62 acquires these changes in pixel values at predetermined intervals over time along the horizontal axis of the graph. A target of which the changes in pixel values are to be acquired may be narrowed down beforehand on the basis of the colors and positions of images for example. If the acquired changes in pixel values do not exceed a threshold value Pth in a period of determination from time 0 to a predetermined time T1 in the graph, the region extraction part 62 decides this image to be the region of non-interest.

According to this determination, the different image presentation part 66 starts composing the different image in the region of non-interest from time T1 on. Meanwhile, the region extraction part 62 continuously acquires the changes in pixel values in the original moving image. In the illustrated example, the changes in pixel values in the region of non-interest start to increase from a certain time point and exceed the threshold value Pth at time T2. For example, even the background such as the sky that is not generally likely to draw attention may temporarily present considerable changes when fireworks are set off or laser beams are displayed as a side show of an event. At this time, the object that has not draw an attention is highly likely to draw attention all of a sudden.

In view of the above, the region extraction part 62 also monitors the changes in pixel values of a region which has been decided as a region of non-interest to detect whether the region is no longer the region of non-interest. That is, the region extraction part 62 detects that the changes in pixel values exceed the threshold value Pth at time T2, and thus eliminates the region as the region of non-interest. In response to this, the different image presentation part 66 hides the different image having been displayed so far in the region. This avoids the situation where the object of interest such as fireworks is hidden by the different image.

Then, at time T3 at which the changes in pixel values become equal to or less than the threshold value Pth, the region extraction part 62 detects that the region has again become the region of non-interest. In response to this, the different image presentation part 66 resumes composing the different image in the region of non-interest. Note that the illustrated display/non-display control of the different image can also be implemented using the frequency at which the user's line of sight is directed instead of the changes in pixel values. Also, the threshold value at which the different image is switched from the display state to the non-display state may be the same as, or different from, the threshold value at which the different image is switched from the non-display state to the display state.

Furthermore, multiple parameters may be used as the reference for determining the display or non-display of the different image. For example, whereas the region of non-interest at time T1 may be decided on the basis of the changes in pixel values or the frequency at which the user's line of sight is directed, during the periods T2 to T3 where the different image is not displayed, the period in which the display of the different image is not desired, such as the period during which fireworks are scheduled to be set off is preliminarily identified and manually set as non-display. As another alternative, the different image may not be displayed during the entire period illustrated in which the different image is displayed. For example, during the display period, the different image may be displayed at a timing designated by the server 200.

Figure 7:
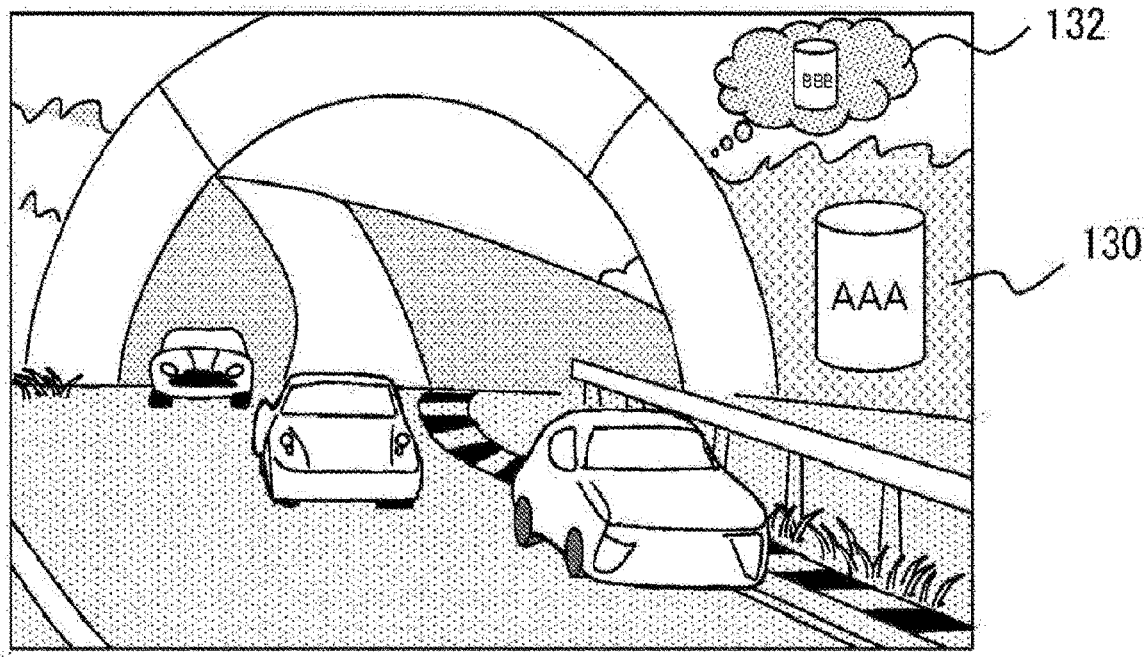
FIG. 7 is a diagram schematically depicting an example of an image displayed in the present embodiment.

FIG. 7 is a diagram schematically depicting an example of the image displayed in the present embodiment. The illustrated image is a frame of a video image of a car race. Two different images 130 and 132 indicative of an advertisement of canned products are composed in the frame. Of the two images, the different image 130 superposed on the image of the mountains in the relatively foreground is displayed with a magnification factor larger than that of the different image 132 superposed on the image of the sky in the background.

In this manner, the different images displayed with magnification factors corresponding to the actual distances of the respective replacement objects provide a sense of unity with the original image. Note that, in a case where the surface of a replacement object is inclined or curved relative to the camera and the distance varies with the position over the same surface, the display magnification factor of one different image composed on that surface may also be varied with the position. This makes it possible artificially to produce a situation in which the different image remains pasted on the replacement object. Even in such a case, however, the display magnification factor of one different image is fixed regardless of the position, thereby making it possible to promote the visibility.

What has been explained so far is how the different image is composed in the region of non-interest in the moving image displayed on the head-mounted display 100. Alternatively, a different image may be displayed on AR glasses letting real-world images pass through, in such a manner that the different image is merged with the real image. In this case, too, the region extraction part 62 in the image processing apparatus 10 extracts the region of non-interest from a frame of the moving image concurrently presenting the space being viewed by the user through the AR glasses. The different image presentation part 66 then causes the different image to be displayed in a region corresponding to the region of non-interest in the real image viewed through the AR glasses, i.e., in the real-image region of the replacement object.

Figure 8:
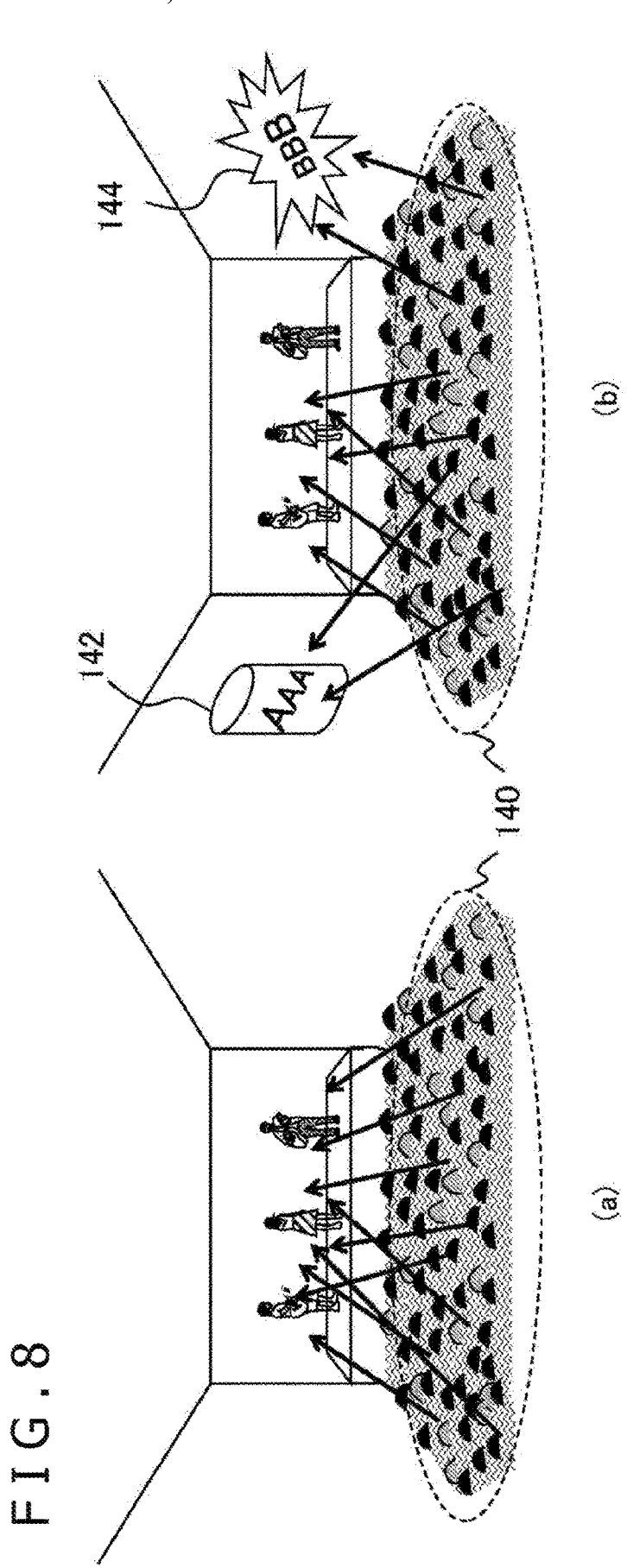
FIG. 8 is a diagram explanatory of how to obtain a viewing rate at a time of displaying a different image on AR glasses worn by audience during a concert in the real world, in the present embodiment.

FIG. 8 is a diagram explanatory of how to obtain a viewing rate at a time of displaying a different image on AR glasses worn by audience during a concert in the real world. Subfigure (a) first depicts a concert hall in the real world. It is assumed that the audience in seats 140 wear AR glasses. In a state where no different image is displayed, the lines of sight of the audience are naturally focused on players on a stage. In the drawing, some of the lines of sight of the audience are represented by arrows.

In Subfigure (b), on the other hand, the right and left walls of the hall are used as the replacement objects on which different images 142 and 144 are displayed. That is, in the actual state of Subfigure (a), the audience wearing the AR glasses can see the different images 142 and 144 apparently displayed on both walls. In such a state, there is a growing possibility that the lines of sight of the audience are directed to the different images as indicated by arrows. The viewing rate calculation part 56 then acquires changes in the lines of sight before and after the different images are displayed as described above. Specifically, the viewing rate calculation part 56 collects movements of the lines of sight of the audience from the image processing apparatus 10 that causes the images to be displayed on the AR glasses worn by the audience.

Thereafter the viewing rate calculation part 56 calculates an average, per spectator, of the accumulated times in which the lines of sight have been directed to the right and left walls over a predetermined time period. For example, if the average values are assumed to be t1 and t2 before and after display of the different images, respectively, the viewing rate calculation part 56 calculates t2/t1 or t2-t1 as the viewing rate. Alternatively, the number of times the lines of sight have been directed may be used in place of the accumulated times in which the lines of sight have been directed. Since the higher the viewing rate, the higher the effects of the different images being displayed are assumed to be, the viewing rate can be used as the ground for setting advertisement charges and for optimizing the replacement objects on which the different images are to be displayed, for example.

Note that similar viewing rates can also be acquired in a mode in which a different image is composed in the moving image displayed on the head-mounted display 100. That is, in a situation where the moving image of the concert is displayed as depicted in Subfigure (a), the image processing apparatus 10 composes the different images 142 and 144 as illustrated in Subfigure (b). In this case, too, it is possible to obtain changes in the line of sight of the user wearing the head-mounted display 100. The viewing rate calculation part 56 in the server 200 can calculate the viewing rate in a manner similar to what has been discussed above by collecting the changes in the lines of sight of multiple users.

Explained next are the workings of the image processing apparatus 10 implemented by use of the above-described configuration. FIG. 9 is a flowchart indicative of processing steps for displaying a content image, the steps being performed by the image processing apparatus 10 in the present embodiment. The steps of this flowchart are started when the user wearing the head-mounted display 100 performs input on the image processing apparatus 10 to select the content desired to be viewed. First, the image acquisition part 60 in the image processing apparatus 10 starts acquiring moving image data of the selected content (S10).

The data may be transmitted from the server 200 or retained inside the image processing apparatus 10 as discussed above. On the basis of predetermined conditions, the region extraction part 62 extracts the region of non-interest from the moving image (S12). The information necessary for the extraction may be acquired from the server 200 or retained inside the image processing apparatus 10. As another alternative, the position information acquisition part 64 may acquire the position information regarding the subject and use the acquired information for extracting the region of non-interest.

Depending on the extraction condition, it may take at least a certain amount of time to do the extraction. For this reason, the output part 70 may output the moving image data to the head-mounted display 100 concurrently with the process in S12. Immediately after the extraction, the changes in pixel values of the region of non-interest and the frequency at which the line of sight is directed are obviously equal to or less than their respective threshold values (Y in S14). Thus, the different image presentation part 66 displays the different image in the extracted region of non-interest (S16).

At this point, the different image presentation part 66 may decide the display magnification factor of the different image according to the distance of the replacement object acquired by the position information acquisition part 64. The data of the different image may be read out from the different image data storage part 68 or acquired from the server 200 when needed. The output part 70 outputs to the head-mounted display 100 the data of the display image in which the different image is composed (S18). If there is no need to terminate the display (N in S20), the different image is continuously output and caused to be displayed in subsequent frames (Yin S14, S16, and S18).

However, if the region extraction part 62 detects that the changes in pixel values of the region of non-interest or the frequency at which the line of sight is directed has exceeded the corresponding threshold value (N in S14), the process in S16 is skipped in order to place the different image in a non-display state. It is to be noted that the determination in S14 is not necessarily performed in units of a frame. Preferably, a predetermined time period for the determination may be established, so that the display state and the non-display state of the different image are not switched with one another at short time intervals. If the moving image is ended or if the display needs to be terminated as a result of the user's stop operation, the whole processing is brought to an end (Y in S20).

According to the above-described embodiments of the present invention, a region of an image of a target object not included in the object of interest in the moving image of content is extracted as the region of non-interest. An image different from the target object is then displayed in the extracted region. This promotes effective utilization of the screen based on the configuration of the original image and thereby presents diverse pieces of information at the same time. When an actually presented image is used as the destination in which the different image is to be displayed, a sense of unity is brought about for the entire image. As a result, the user can recognize the presented information naturally without shifting his or her line of sight considerably from the moving image.

Also, whether or not to display the different image and how to determine the magnification factor of the different image are decided on the basis of the actual circumstances such as the positions of the target objects, the manner in which images are displayed, and the frequency at which the user's line of sight is directed. This enables the different image to be displayed comfortably while respecting the details of the moving image and the intentions of the user. Particularly in image representation using a head-mounted display, the inventive display does not impair the realistic sensations as compared to simply displaying information in a fixed region on the screen. Also, the amount of the information constituting the image of the original replacement object is reduced beforehand, so that it is also possible to reduce the size of the data to be transmitted from the server.

The present invention has been described above in conjunction with specific embodiments. It is to be understood by those skilled in the art that suitable combinations of the constituent elements and of various processes of the embodiments described above as examples will lead to further variations of the present invention and that such variations also fall within the scope of this invention.

For example, whereas the image processing apparatus 10 in the present embodiment composes the different image immediately before displaying it, similar effects are obtained when the server 200 composes the different image and distributes it to the image processing apparatus 10. In this case, the server 200 is configured with the image acquisition part 60, the region extraction part 62, and the different image presentation part 66. The distribution processing part 50 need only transmit to the image processing apparatus 10 the data of the moving image in which the different image is composed.

INDUSTRIAL APPLICABILITY

As discussed above, the present invention may be applied to diverse kinds of information processing apparatuses including an image processing apparatus, a wearable display, a game console, a mobile terminal, a personal computer, and an image distribution server, as well as to systems including any of these apparatuses.

REFERENCE SIGNS LIST

10 Image processing apparatus
23 CPU
24 GPU
26 Main memory
32 Communication part
34 Storage part
36 Output part
38 Input part
40 Recording medium driving part
50 Distribution processing part
52 Content data storage part
54 Region information acquisition part
56 Viewing rate calculation part
60 Image acquisition part
62 Region extraction part
64 Position information acquisition part
66 Different image presentation part
68 Different image data storage part
70 Output part
72 Line-of-sight information acquisition part
100 Head-mounted display
110 Stereo camera
200 Server

The invention claimed is:
1. An image distribution system comprising:
an image processing apparatus; and
a server,
wherein the image processing apparatus includes
an image acquisition part configured to acquire data of a moving image representing a space to be viewed,
a region extraction part configured to extract, as a region of non-interest, a region of an image of any one of target objects not included in an object of interest in a frame of the moving image, and
a different image presentation part configured to present and output an image different from the image of the target object in the region of non-interest,
wherein the server transmits the data of the moving image to the image processing apparatus, the server including a viewing rate calculation part configured to acquire information regarding a direction of a line of sight of a user viewing an image output from the image processing apparatus, the viewing rate calculation part further calculating a viewing rate of the different image on a basis of changes in the direction of the line of sight before and after the different image is displayed, and
wherein at least one of: (i) the region extraction part detects a time period in which the temporal changes in the pixel values of the constituent pixels constituting the region of non-interest exceed a predetermined value, and (ii) the image acquisition part acquires the data of the moving image and information regarding a condition for extracting the region of non-interest from a server over a network.

2. The image distribution system according to claim 1, wherein the region extraction part extracts, as the region of non-interest, the region of which the constituent pixels have temporal changes in pixel values that are equal to or less than a predetermined value.

3. The image distribution system according to claim 1, wherein
the image acquisition part acquires registered information designating the target object, and
the region extraction part extracts the region of non-interest identified by referencing the registered information.

4. The image distribution system according to claim 1, further comprising:
a line-of-sight information acquisition part configured to acquire information regarding a direction of a line of sight of a user,
wherein the region extraction part extracts, as the region of non-interest, a region of an image to which the line of sight is directed at a frequency equal to or less than a predetermined value.

5. The image distribution system according to claim 1, wherein the region extraction part extracts the region of an image of the sky or of a ceiling as the target object.

6. The image distribution system according to claim 1, wherein, given an upper region and a lower region vertically bisecting the frame, the region extraction part extracts the region of non-interest from the upper region.

7. The image distribution system according to claim 1, further comprising:
a position information acquisition part configured to acquire position information regarding a subject in a three-dimensional image capturing space,
wherein the region extraction part extracts, as the region of non-interest, a region of an image of the subject of which a distance from a camera capturing the moving image is equal to or longer than a predetermined value.

8. The image distribution system according to claim 1, wherein the different image presentation part presents the different image with a magnification factor corresponding to the distance of the target object appearing in the region of non-interest from the camera capturing the moving image.

9. The image distribution system according to claim 1, wherein the different image presentation part places the different image in a non-display state during the time period.

10. The image distribution system according to claim 1, wherein the image acquisition part acquires, from a server over a network, the data of the moving image in which an amount of information constituting the image of the target object in the region of non-interest out of the frame of the moving image is reduced.

11. The image distribution system according to claim 1, wherein the region extraction part extracts the region of non-interest on a basis of the information regarding the condition.

12. The image distribution system according to claim 1, wherein the different image presentation part presents the different image in a region corresponding to the region of non-interest within a field of view of augmented reality glasses worn by a user viewing the space represented by the moving image.

13. An image distribution system comprising:
 a server; and
 an image processing apparatus,
 wherein the server includes
 an image acquisition part configured to acquire data of a moving image representing a space to be viewed,
 a region extraction part configured to extract, as a region of non-interest, a region of an image of any one of target objects not included in an object of interest in a frame of the moving image, and
 a different image presentation part configured to present an image different from the image of the target object in the region of non-interest,
 wherein the image processing apparatus acquires over a network the data of the moving image output from the server and representing the different image, the image processing apparatus further causing a display apparatus to display the moving image,
 wherein the server acquires information regarding a direction of a line of sight of a user viewing an image output from the image processing apparatus, the server further calculating a viewing rate of the different image on a basis of changes in the direction of the line of sight before and after the different image is displayed, and
 wherein at least one of: (i) the region extraction part detects a time period in which the temporal changes in the pixel values of the constituent pixels constituting the region of non-interest exceed a predetermined value, and (ii) the image acquisition part acquires the data of the moving image and information regarding a condition for extracting the region of non-interest from a server over a network.

14. An image distribution method comprising:
 acquiring data of a moving image representing a space to be viewed;
 extracting, as a region of non-interest, a region of an image of any one of target objects not included in an object of interest in a frame of the moving image;
 presenting and outputting an image different from the image of the target object in the region of non-interest;
 causing a server to transmit the data of the moving image to the image processing apparatus, the server being further caused to acquire information regarding a direction of a line of sight of a user viewing an image output from the image processing apparatus, the server being further caused to calculate a viewing rate of the different image on a basis of changes in the direction of the line of sight before and after the different image is displayed; and
 at least one of: (i) detecting a time period in which the temporal changes in the pixel values of the constituent pixels constituting the region of non-interest exceed a predetermined value, and (ii) acquiring the data of the moving image and information regarding a condition for extracting the region of non-interest from a server over a network.

* * * * *